(12) United States Patent
Yuasa et al.

(10) Patent No.: US 7,436,398 B2
(45) Date of Patent: Oct. 14, 2008

(54) OPERATING DEVICE

(75) Inventors: Go Yuasa, Kawachi-gun (JP); Masaki Sato, Shioya-gun (JP); Morihisa Iwamoto, Utsunomiya (JP); Yasuhiro Konishi, Kawagoe (JP); Keiji Takeda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 10/787,769

(22) Filed: Feb. 27, 2004

(65) Prior Publication Data
US 2004/0189595 A1 Sep. 30, 2004

(30) Foreign Application Priority Data
Mar. 27, 2003 (JP) ............................. 2003-087714
Oct. 10, 2003 (JP) ............................. 2003-352947

(51) Int. Cl.
*G09G 5/00* (2006.01)
(52) U.S. Cl. .................... 345/184; 345/156; 345/157; 345/161; 340/691.6; 340/525; 200/5 R; 200/5 A
(58) Field of Classification Search ................ 345/156, 345/161, 184
See application file for complete search history.

(56) References Cited

U.S. PATENT DOCUMENTS 4,479,038 A * 10/1984 Marhold et al. ............. 200/6 A
5,260,825 A * 11/1993 Nagano et al. .............. 359/368
5,436,413 A * 7/1995 Katakami .................... 200/14
6,067,424 A * 5/2000 Shono ....................... 396/297
6,741,232 B1 * 5/2004 Siedlikowski et al. ....... 345/156
7,038,667 B1 * 5/2006 Vassallo et al. ............. 345/184

FOREIGN PATENT DOCUMENTS

| JP | S63-12125 | 1/1988 |
| JP | 02-187814 | 7/1990 |
| JP | H07-30431 | 6/1995 |
| JP | 10-340152 | 12/1998 |
| JP | 2001-524708 | 12/2001 |

* cited by examiner

*Primary Examiner*—Richard Hjerpe
*Assistant Examiner*—Jennifer T Nguyen
(74) *Attorney, Agent, or Firm*—Arent Fox LLP

(57) ABSTRACT

An operating device for controlling a display screen, which includes a rotatable operating member of cylindrical shape, and a slidable operating member having a cylindrical tip portion located above an upper end of the rotatable operating member. The diameter of an upper surface of the slidable operating member cylindrical tip portion is reduced relative to a diameter of a lower surface of the cylindrical tip portion, and the diameter of the lower surface of the slidable operating member cylindrical tip portion is equal to or less than a diameter of an upper surface of the rotatable operating member. An operating device is provided which prevents a misoperation in slide operation and rotation operation and improves operability.

10 Claims, 10 Drawing Sheets

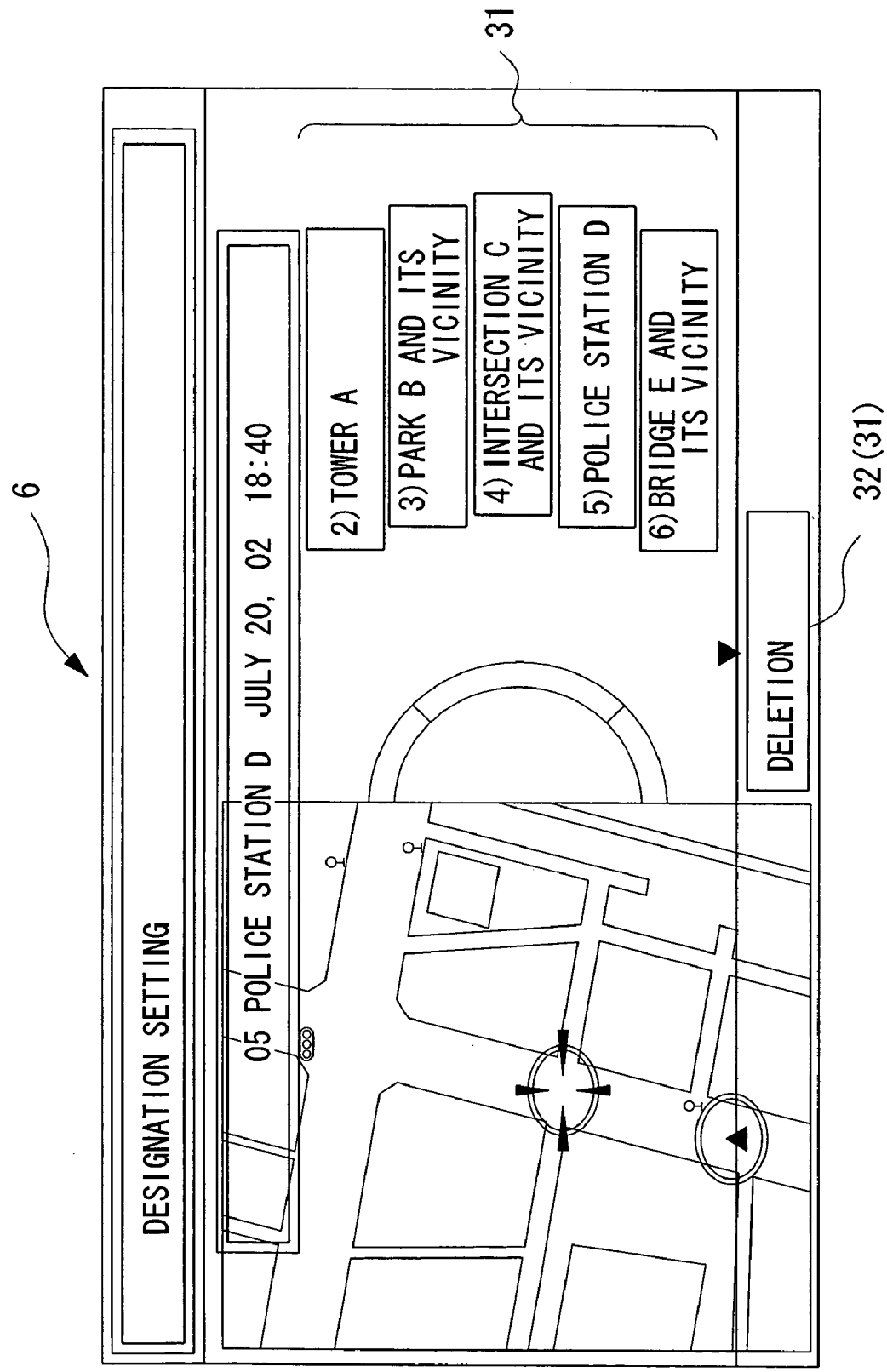

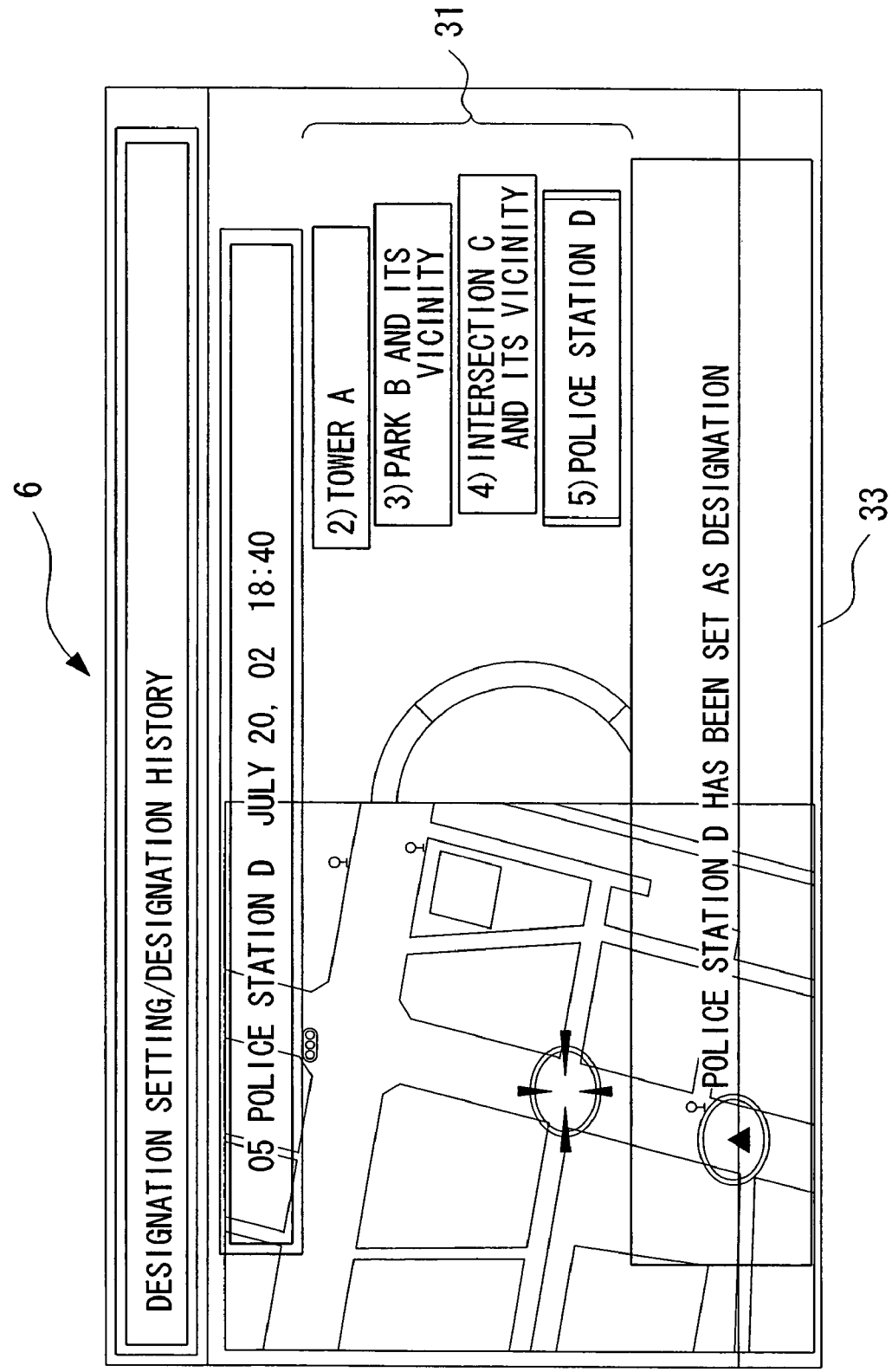

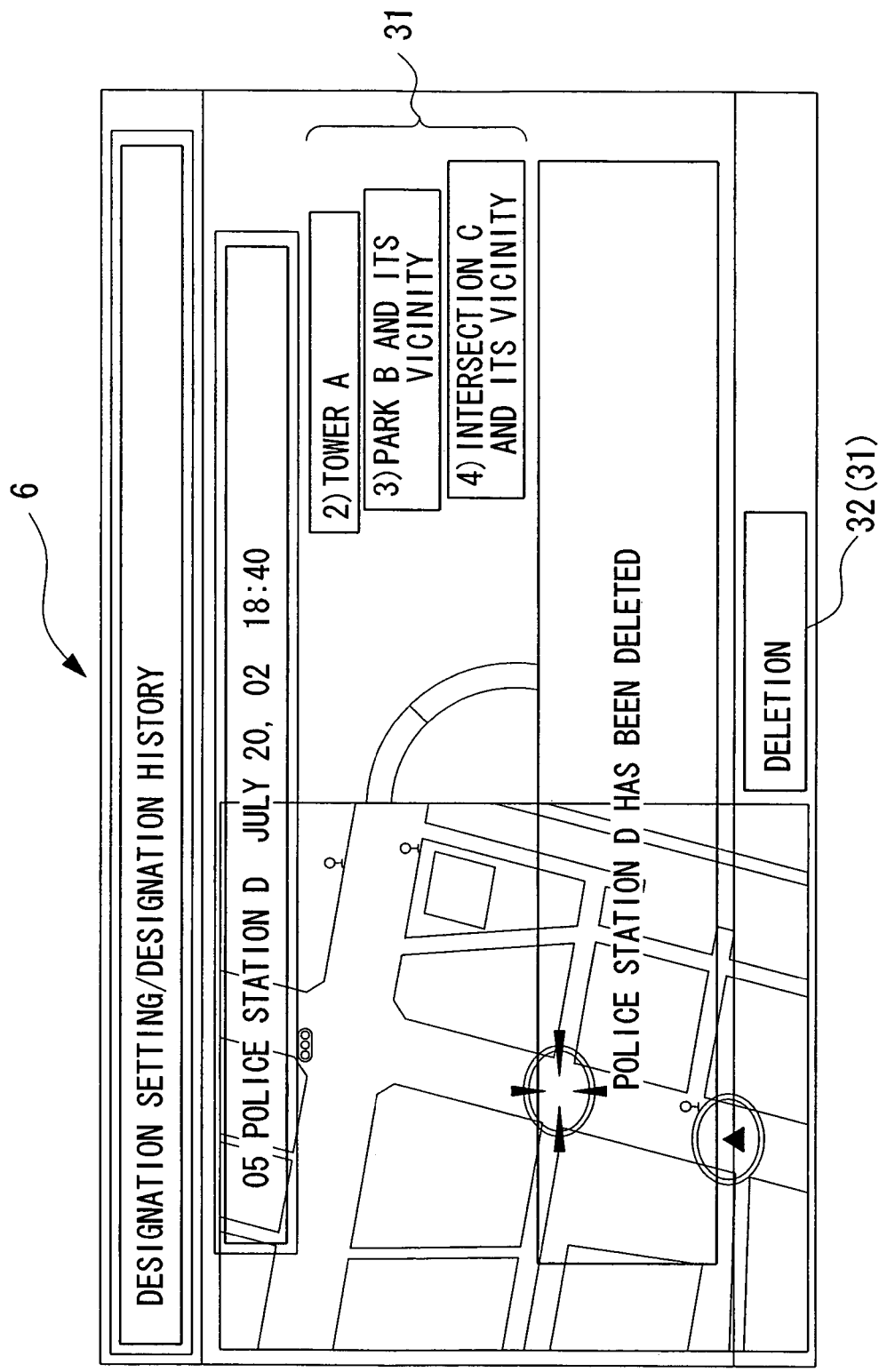

OPERATING DEVICE

BACKGROUND OF THE INVENTION

1. Field of the Invention

Priority is claimed on Japanese Patent Application No. 2003-352947, filed Oct. 10, 2003, and on Japanese Patent Application No. 2003-87714, filed Mar. 27, 2003, the contents of which are incorporated herein by reference.

The present invention relates to an operating device for controlling a display screen by using a rotatable operating member and a slidable operating member.

2. Description of Related Art

Conventionally, an operating device is disclosed in Japanese Patent Application Unexamined Publication No. 2001-524708 which is provided with an operating member displaceable in an axial direction and rotatable around the axial direction, and in which selection is made among various processing items on the display screen of a display in accordance with an inputting operation by this operating member.

SUMMARY OF THE INVENTION

In the conventional technique, however, because the slidable member and the rotatable member were a one-piece member, if only one of the slide and rotation operations was intended by the operator, the intended operation often caused an unexpected operation, i.e., rotating and sliding of the operating member, respectively, thus posing an unfavorable problem from the viewpoint of operability.

The present invention has been made in view of the above problem, and an object thereof is to provide an operating device which enables preventing a misoperation when performing the slide or rotation operation, and which makes an improvement in operability.

In order to solve the above problem, according to an aspect of the present invention, there is provided an operating device for controlling a display screen, comprising: a rotatable operating member of cylindrical shape; and a slidable operating member having a cylindrical tip portion located above an upper end of the rotatable operating member, the rotatable operating member and the slidable operating member being used for controlling the display screen, wherein a diameter of an upper surface of the cylindrical tip portion of the slidable operating member is reduced relative to a diameter of a lower surface of the cylindrical tip portion, and the diameter of the lower surface of the cylindrical tip portion of the slidable operating member is equal to or less than a diameter of an upper surface of the rotatable operating member.

With the above operating device, since the rotatable and slidable operating members are constructed as separate members, and the diameter of the upper surface of the slidable operating member tip portion is reduced relative to the diameter of the lower surface of the slidable operating member tip portion, an operator can grasp these operating members from above without interference by an upper portion thereof, leading to an easy operation. In addition, because the diameter of the lower surface of the slidable operating member tip portion is equal to or less than the diameter of the upper surface of the rotatable operating member, a misoperation may be prevented that is caused by an operator touching the slidable operating member when he operates the rotatable operating member, thereby improving the rotation operability.

Preferably, in the above operating device, a height of the rotatable operating member is greater than a height of the cylindrical tip portion of the slidable operating member.

With the above structure, because it is easier for an operator to grasp the rotatable operating member from above without touching the slidable operating member, the rotation operability can further be improved. In addition, because the height of the slidable operating member tip portion is smaller than the height of the rotatable operating member, the slidable operating member can be reduced in weight, making it possible for a slide operation to be performed with a small force and improving the slide operability.

Preferably, the diameter of the lower surface of the cylindrical tip portion of the slidable operating member is less than the diameter of the upper surface of the rotatable operating member to provide a relief portion on the upper surface of the rotatable operating member.

With the above structure, because the slidable operating member tip portion and the rotatable operating member are different in diameter, an operator can easily distinguish the operating members from each other without looking at them. In addition, because the slidable operating member does not interfere with a finger when an operator holds the rotatable operating member, the operator can operate the slidable operating member with the palm of his hand while manipulating the rotatable operating member with his fingers. Thus, the operation can be done without exchanging one for the other of the operating members, leading to an improved operability. Furthermore, because the slidable operating member is reduced in weight, an easier operation of the slidable operating member is attainable.

Preferably, the rotatable operating member is provided on a projection such that a side surface of the rotatable operating member is contiguous to the projection.

With the above structure, because the projection provides a spacing between the rotatable operating member and a general surface that corresponds to the dimension of the projection, even if an operator grasps at the base side of the rotatable operating member, the nail or finger tip of the operator may be prevented from contacting the general surface. Thus, the operator will not suffer discomfort, leading to an improved operability. In addition, by catching hold of the projection with a finger, a misoperation due to vibrations of the vehicle or the like may be prevented, leading to improved operability. Furthermore, by making the rotatable operating member a rotation-only member, its effect may be further improved.

According to another aspect of the present invention, there is provided an operating device comprising: a rotatable operating dial that is rotated to make a selection among menus displayed on a screen; and a slidable operating member that is depressed to make a decision on the menus, wherein a modify feature is allocated to slide operation of the slidable operating member.

With the above operating device, because the modification can be done through only one slide operation of the slidable operating member, unlike the case where the modification is done with the rotatable operating member, the adjustment of its rotation amount for switching from the selected menu to the menu with a modify feature and the screen viewing work that accompanies the above adjustment becomes unnecessary, leading to a reduction in operation time and an improved convenience.

According to still another aspect of the present invention, there is provided an operating device for controlling a display screen, comprising: a rotatable operating member of cylindrical shape; a slidable operating member having a tip portion located above an upper end of the rotatable operating member, the rotatable operating member and the slidable operating member being used for controlling the display screen, wherein a diameter of an upper surface of the rotatable operating member is reduced relative to a diameter of a lower surface of the rotatable operating member to provide an inclined side surface, and wherein the tip portion of the slidable operating member is located inwardly of an imaginary line extending from the inclined side surface of the rotatable operating member.

With the above operating device, an operator may grasp these operating members from above without interference by an upper portion thereof, leading to an easy operation. In addition, because the slidable operating member is located inwardly of the imaginary line extending from the inclined side surface of the rotatable operating member, a misoperation may be prevented that is caused by the operator touching the slidable operating member when he operates the rotatable operating member, thus improving the rotation operability.

Preferably, in the above operating device, the rotatable operating member is provided on a projection such that the inclined side surface of the rotatable operating member is contiguous to the projection.

With the above structure, even if an operator grasps at the base side of the rotatable operating member, the nail or finger tip of the operator may be prevented from contact with a general surface. Thus, the operator will not suffer from discomfort, leading to an improved operability.

Advantageously, in the preceding operating devices, the diameter of the upper surface of the rotatable operating member is also reduced relative to a diameter of a lower surface of the rotatable operating member.

The above and other objects and features of the present invention will become more apparent from the following description taken in conjunction with the accompanying drawings.

BRIEF DESCRIPTION OF THE DRAWINGS

FIG. 8 is an explanatory view of an example of a display screen of the display as shown in FIG. 1.

FIG. 9 is an explanatory view of an example of a display screen of the display as shown in FIG. 1.

FIG. 10 is an explanatory view of an example of a display screen of the display as shown in FIG. 1.

DETAILED DESCRIPTION OF THE INVENTION

An embodiment of an operating device of the present invention will now be described with reference to the drawings.

Figure 1:
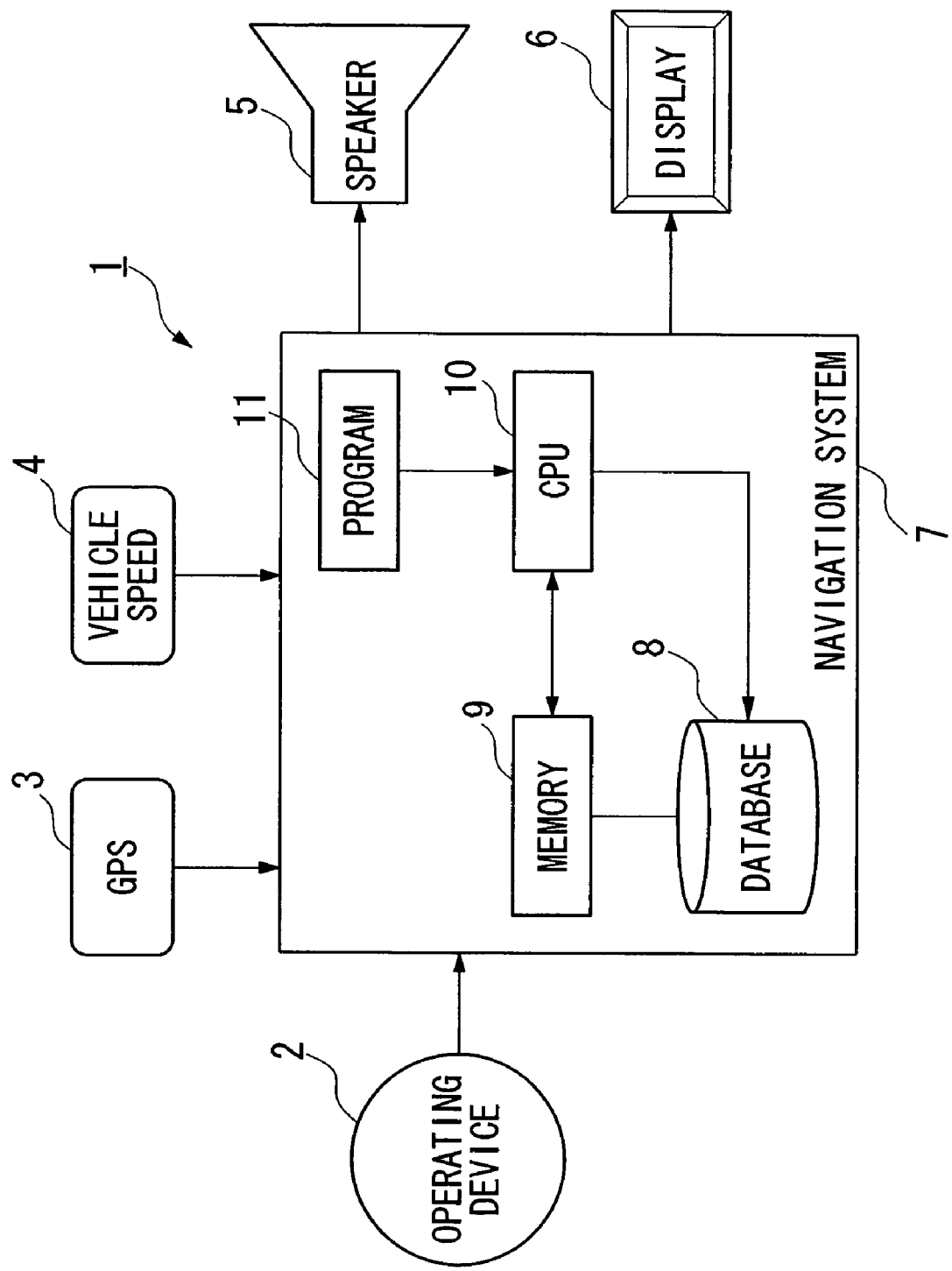
FIG. 1 is a schematic structural view of a vehicle with an operating device according to an embodiment of the present invention mounted thereon.

FIG. 1 is a schematic structural view of a vehicle 1 with an operating device 2 according to the embodiment of the present invention mounted thereon.

The vehicle 1 is equipped with the operating device 2, a GPS sensor 3, a vehicle speed sensor 4, a speaker 5, a display 6, and a navigation system 7. The navigation system 7 is inputted with respective signals from the operating device 2, the GPS sensor 3 and the vehicle speed sensor 4, and produces output to the speaker 5 and the display 6 based on these signals.

Each device will be described below.

The operating device 2 is operated by an inputting operation by an operator (vehicle occupant in this case) and can perform input work to the display 6 through the navigation system 7. The details will be described later.

The GPS sensor 3 detects the positional information of the vehicle 1, and the vehicle speed sensor 4 detects the velocity V of the vehicle 1, and their respective detected values are inputted into the navigation system 7.

The navigation system 7 includes a database 8, a memory 9, a CPU 10, and a program 11. The database 8 stores data concerning various items and their contents that are to be displayed on the display 6. Speech recognition lexicons are stored in memory in the database 8 in correspondence to various data.

Furthermore, data extracted from the database 8, data inputted from the operating device 2, speech recognition lexicons of these data, and the like are written and erased as appropriate in the memory 9. The CPU 10 operates on the program 11 and performs the extracting processing of data from the database 8 to the memory 9, conversion processing of speech recognition lexicons associated with the extracted data into a speech file, outputting processing to the speaker 5 and the display 6, and the like. The display 6 displays data and map data, which are outputted from the memory 9 by the CPU 10, on its display screen. The speaker 5 voice-outputs the speech file outputted by the CPU 10.

Figure 2:
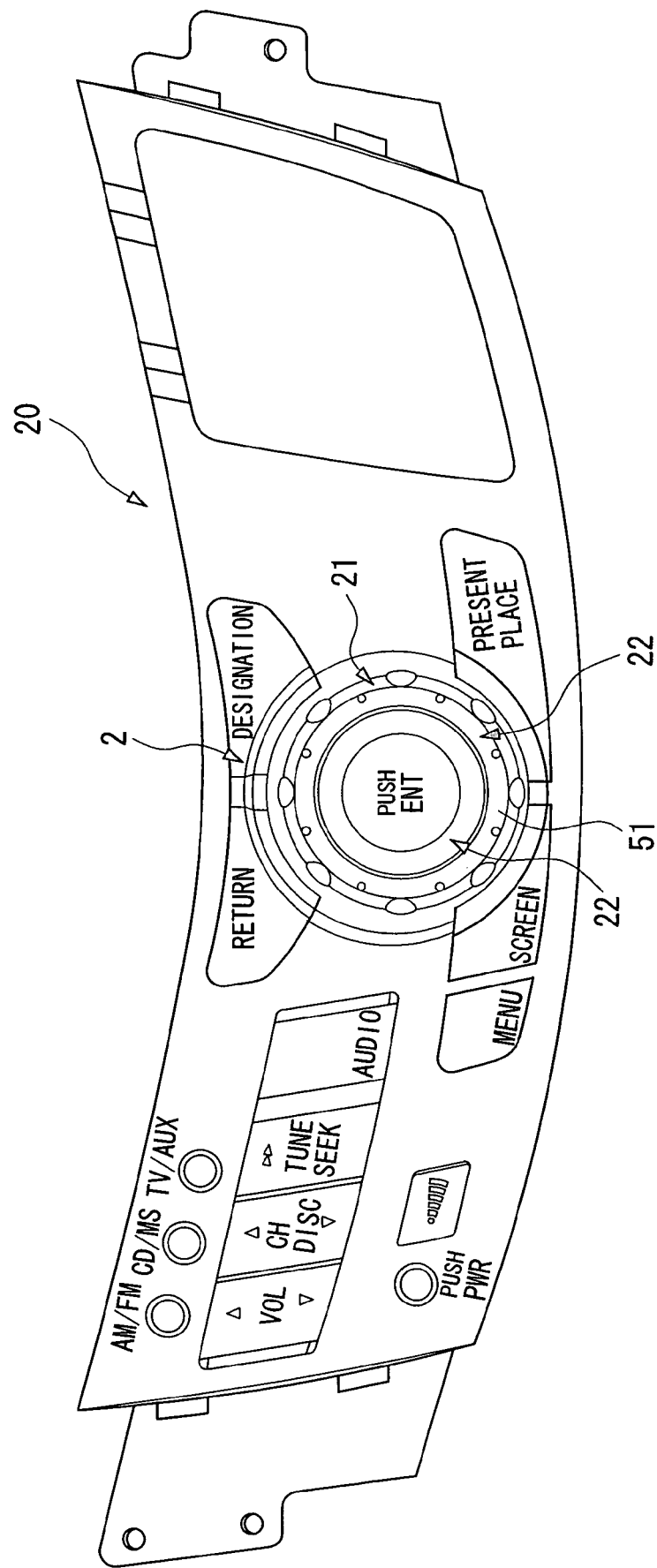
FIG. 2 is a front view of an instrument panel where the operating device as shown in FIG. 1 is provided.

FIG. 2 is a front view of the instrument panel where the operating device as shown in FIG. 1 is disposed. As shown in the figure, the operating device 2 is provided in a projecting manner substantially at the center of the instrument panel 20. The operating device 2 will be described below.

Figure 3:
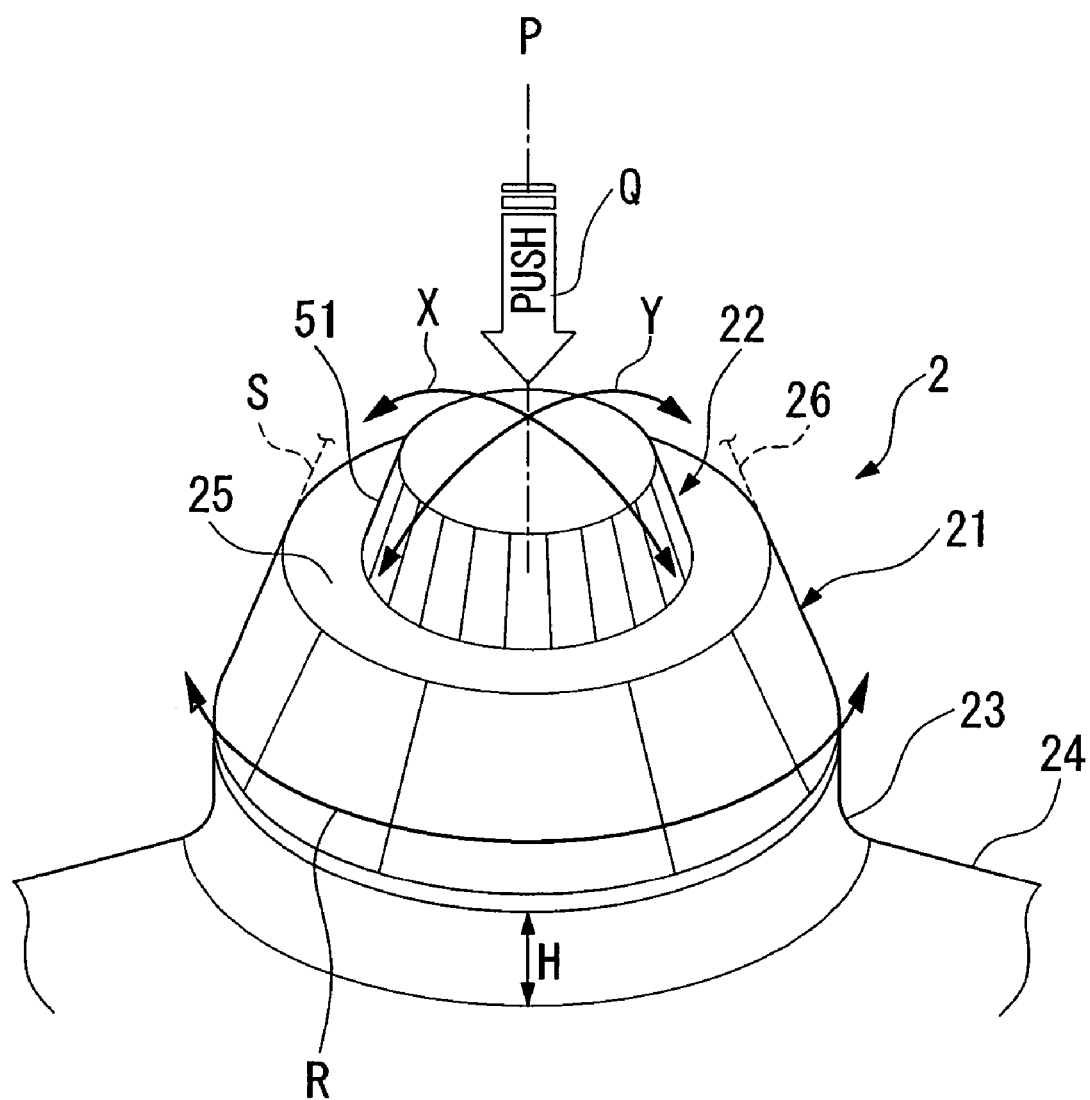
FIG. 3 is a perspective view of the operating device as shown in FIG. 1.

FIG. 3 is a perspective view of the operating device as shown in FIG. 1. The operating device 2 is configured such that a slidable operating member 22 has its tip portion (a knob 51) projecting above a rotatable operating member 21. The rotatable operating member 21 is formed with a cylindrical contour, and the diameter LK1 (FIG. 5) of its upper surface is reduced relative to the diameter LK2 of its lower surface, thereby providing an inclined side surface. As will be described later in connection with FIG. 5, the rotatable operating member 21 allows only rotating operation centering around the axis P (in the direction of a double-headed arrow R) and is set to be inoperable in the axis P direction and in directions X and Y perpendicular thereto.

On the other hand, the slidable operating member 22 is formed with a cylindrical contour having the same axis P as the rotatable operating member 21 and is located inwardly of an imaginary line S extending from the inclined side surface of the rotatable operating member 21. The slidable operating member 22 is capable of being depressed in the axis P direction as indicated by an arrow Q and is capable of sliding in the two directions X and Y perpendicular to the axis P direction. Note that in the present embodiment the term "slide" includes horizontal movement of the slidable operating member 22 in the directions X and Y relative to the axis P and rocking movement in the directions X and Y relative to the axis P.

Regarding the knob 51 of the slidable operating member 22, like the rotatable operating member 21, the diameter LS1 of its upper surface is reduced relative to the diameter LS2 of its lower surface, thereby providing an inclined side surface. The diameter of the lower surface of the slidable operating member knob 51 is smaller than the diameter of the upper surface of the rotatable operating member 21. Due to the above, an upper surface outer circumference side of the rotatable operating member 21 is exposed from below the lower surface of the slidable operating member knob 51, so as to provide a later-described relief portion 25. In addition, the height HK (FIG. 5) of the rotatable operating member 21 is set greater than the height HS of the knob 51 of the slidable operating member 22.

Furthermore, the rotatable operating member 21 is provided on, and has its side surface contiguous to, a projection 23 on a general surface 24 so as to secure a spacing between the rotatable operating member 21 and the general surface 24 that corresponds to the dimension of the projection 23 (double-headed arrow H in FIG. 3).

Figure 5:
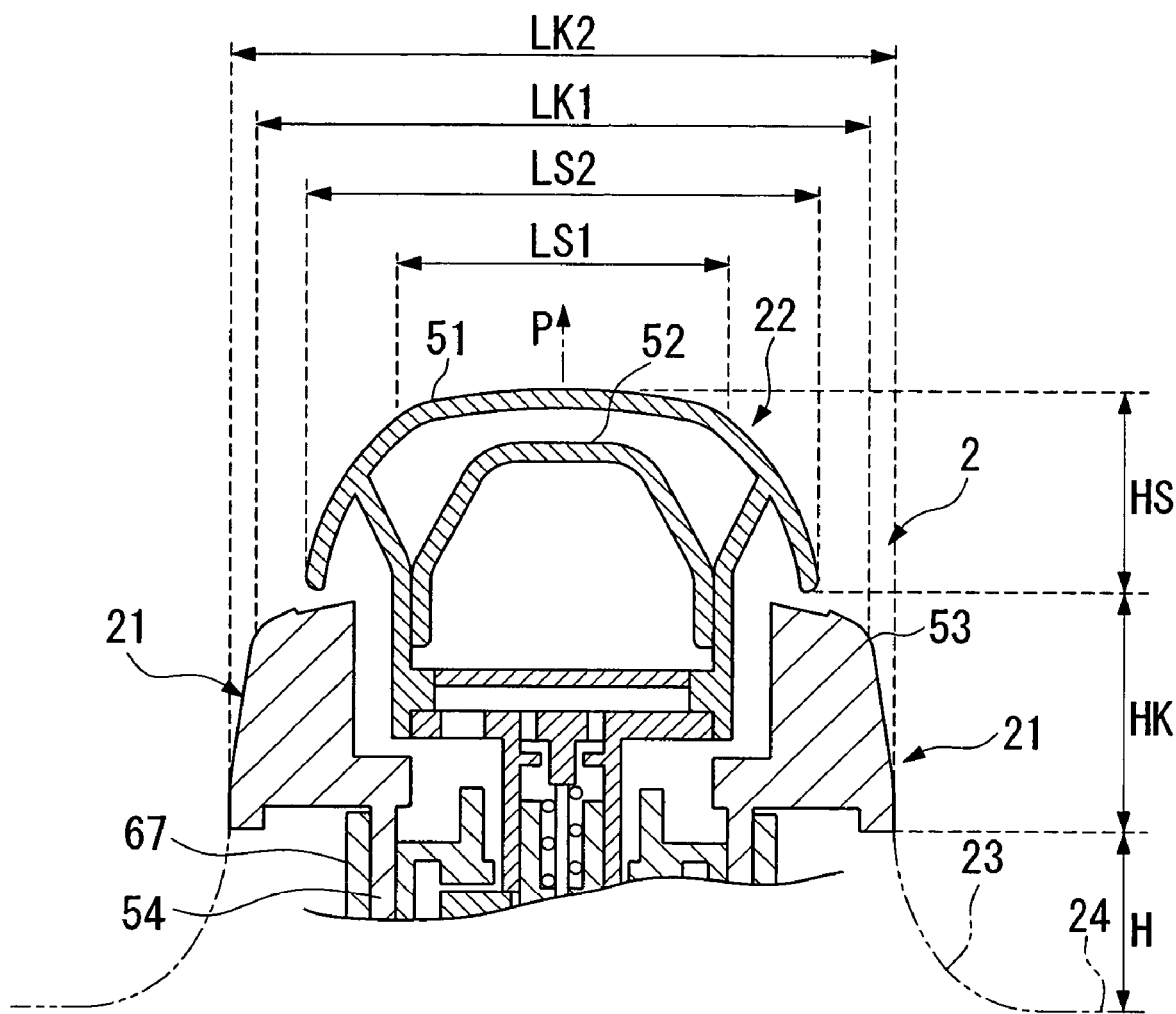
FIG. 5 is a sectional view of the operating device as shown in FIG. 3.

The internal structure of the operating device 2 will be described in detail with reference made to FIG. 5, which is a sectional view of the operating device 2. As shown in FIG. 5, the operating device 2 has a region exposed from the general surface 24 of the instrument panel 20 that is semicircular in section and a region buried in the general surface 24 that is convex-shaped in cross section.

The rotatable operating member 21 has a rotatable knob 53 exposed to the outside and an outer holder 54 extending downwardly in the axial direction from an inner circumference side of the underside of the rotatable knob 53. The outer holder 54 extends downwardly along and in opposed relation to the inner circumferential surface of a casing 67. The outer holder 54 is rotatably fitted inside the casing 67. Due to the above, if an operator rotates the rotatable knob 53, the outer holder 54 rotates around the axis P integrally with the rotatable knob 53. In addition, if the operator tries to move the rotatable knob 53 in the axis P direction or in a direction perpendicular thereto (direction X or Y), such movement is restricted by the casing 67. Thus, only rotation can be given to the rotatable operating member 21. Furthermore, an encoder (not shown) is mounted inside the casing 67 and detects the rotation angle of the rotatable operating member 21 to output a signal to the navigation system 7.

On the other hand, if an operator presses the knob 51 in the axis P direction, the knob 51 moves downwardly along the axis P direction so as to press an enter switch (not shown) disposed inside the casing 67.

In addition, if the knob 51 is operated to slide in a direction (direction X or Y) perpendicular to the axis P by the operator, the slide operating direction is detected by a switch (not shown) provided inside the casing 67 that detects the displacement in the directions X and Y. After completion of a slide operation, the slidable operating member 22 is returned to a predetermined position by a return mechanism which is not shown.

With the construction as described above, when the operating members 21 and 22 are grasped by an operator from above, an upper portion does not interfere, making it possible for the operator to easily perform each operation (slide and rotation operations). In addition, because the diameter LS2 of the lower surface of the slidable operating member knob 51 is equal to or less than the diameter LK1 of the upper surface of the rotatable operating member 21, a misoperation may be prevented that is caused by an operator touching the slidable operating member 22 when he operates the rotatable operating member 21, thereby improving the rotation operability. Furthermore, because the diameter LS2 of the lower surface of the slidable operating member knob 51 is set smaller than the diameter LK1 of the upper surface of the rotatable operating member 21, and the height HS of the slidable operating member knob 51 is set smaller than the height HK of the rotatable operating member 21, it is possible to light the slider portion of the slidable operating member 22. Due to this, the slide operation may be performed with a small force, thereby improving the slide operability.

In addition, because the rotatable operating member 21 and the knob 51 of the slidable operating member 22 have different diameters, it is possible for an operator to easily distinguish the operating members 21 and 22 from each other without looking at them. Furthermore, the relief portion 25 formed on the rotatable operating member 21 enables a finger tip or nail of the operator not to be interfered with. Because the slidable operating member 22 does not interfere with a finger when an operator holds the rotatable operating member 21, the operator may operate the slidable operating member 22 with the palm of his hand while operating the rotatable operating member 21 with his fingers. Thus, it is possible to operate without exchanging one for the other of the operating members 21 and 22, thereby leading to an improved operability.

Figure 4:
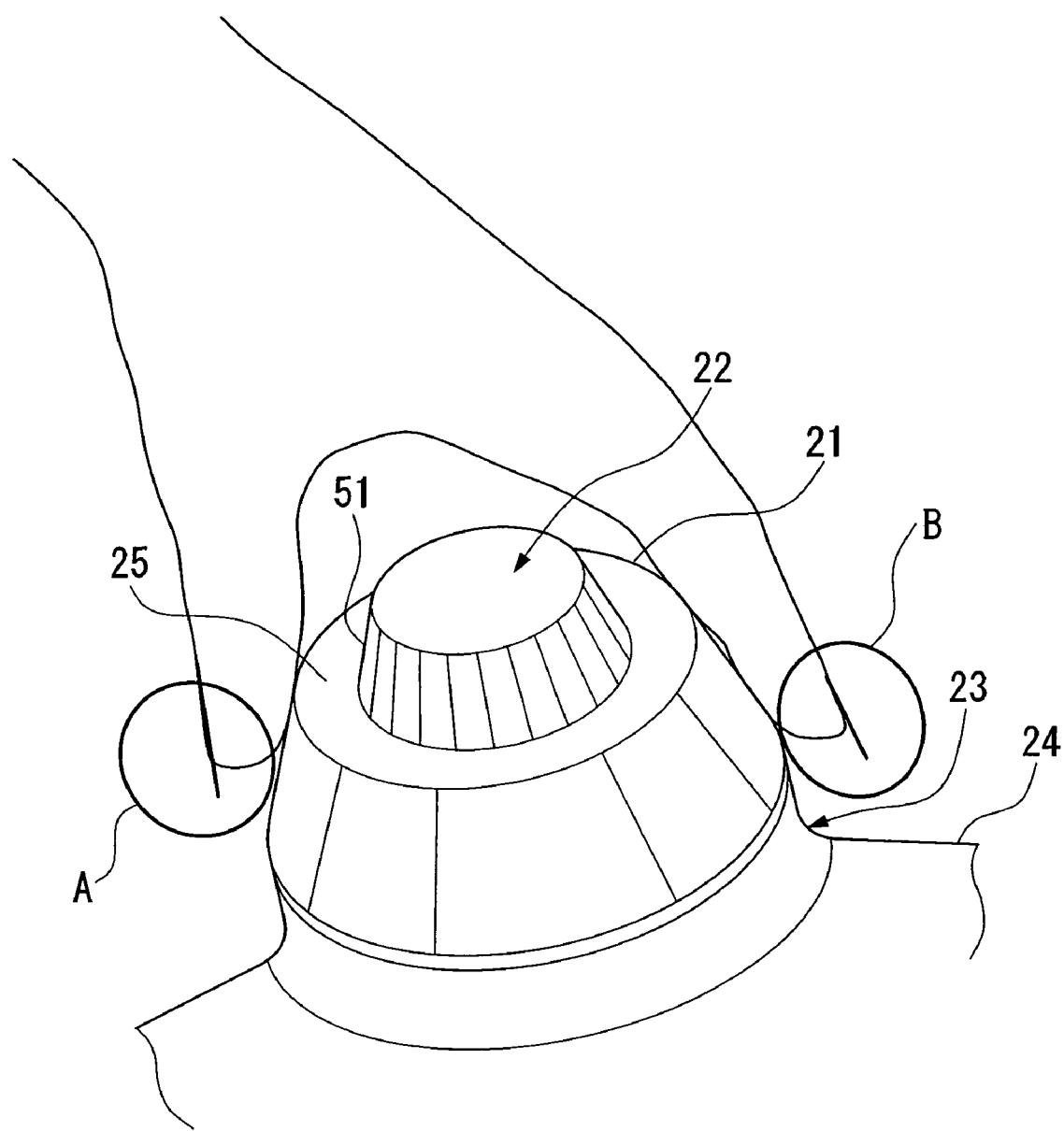
FIG. 4 is an explanatory view of an operating example of the operating device as shown in FIG. 1.

In addition, because a spacing is secured between the rotatable operating member 21 and the general surface 24, which spacing corresponds to the dimension H of the projection 23, even if the operator makes a grasp at the base side of the rotatable operating member 21, the nail or finger tip of the operator may be prevented from contact with the general surface 24 (A and B in FIG. 4). Thus, the operator will not suffer from discomfort which would otherwise be caused by contact of his nail or finger tip with the general surface 24 when operating the rotatable operating member 21, thereby improving the operability.

In the present embodiment, a modify feature is allocated to the slide operation of the slidable operating member 22, which will be described with reference to FIGS. 7 to 10.

Figure 7:
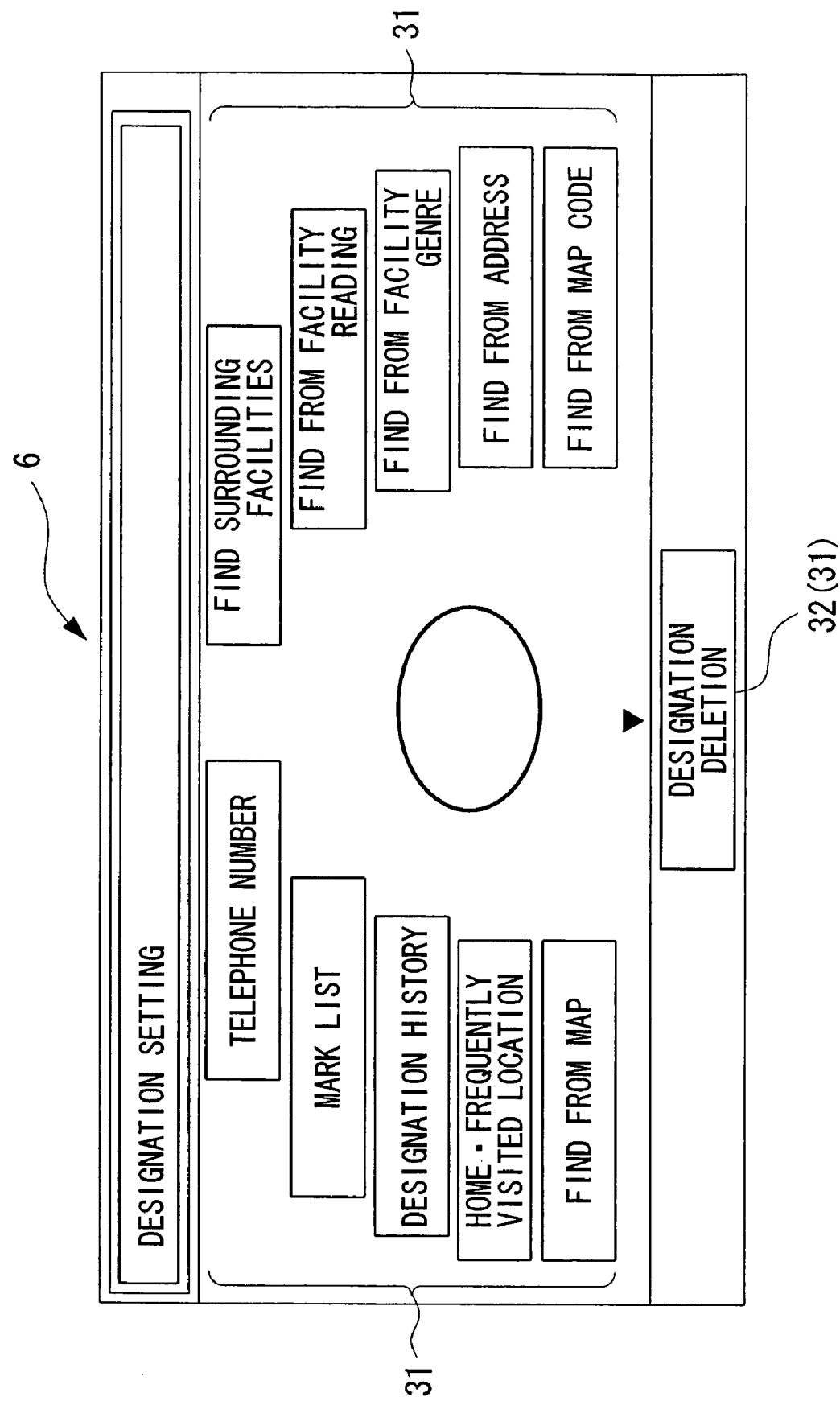
FIG. 7 is an explanatory view of an example of a display screen of the display as shown in FIG. 1.

FIGS. 7 to 10 are explanatory views showing one example of a display screen of the display as shown in FIG. 1. As shown in FIG. 7, a plurality of menus 31 are displayed in a substantially elliptical shape on the display screen of the display 6, of which the menu at the bottom of the ellipse is the modify (designation deletion) menu 32. A selection can be made among these menus 31 by rotating the rotatable operating member 21 (FIG. 8), a decision can be made on the menus 31 by depressing the slidable operating member 22 (FIG. 9), and the decided menu 31 can be modified by sliding the slidable operating member 22. In other words, by sliding among the slidable operating member menus 31, the menu once decided (Police Station D in this case) can be cancelled (deleted) as shown in FIG. 10. Note that in the present embodiment, it is possible to perform the following five modifications, although modifications are not limited thereto.

1) Deletion of one from a history by slide operation
2) Deletion of what has been inputted by slide operation (deletion of an inputted number such as a telephone number)
3) Pointing at the object to be deleted with the cursor by slide operation and entering to delete
4) Moving to the deletion menu by slide operation and entering to delete
5) Cancellation of what has been selected (such as a menu) by slide operation Thus, because the input modification can be performed through only one slide operation of the slidable operating member 22, unlike the case where the input modification is performed with the rotatable operating member 21, the adjustment of its rotation amount for switching from the selected menu 31 to the modification menu 32 with a modify feature and the screen viewing work that accompanies the above adjustment becomes unnecessary, leading to a reduction in operation time and an improved convenience.

Figure 6:
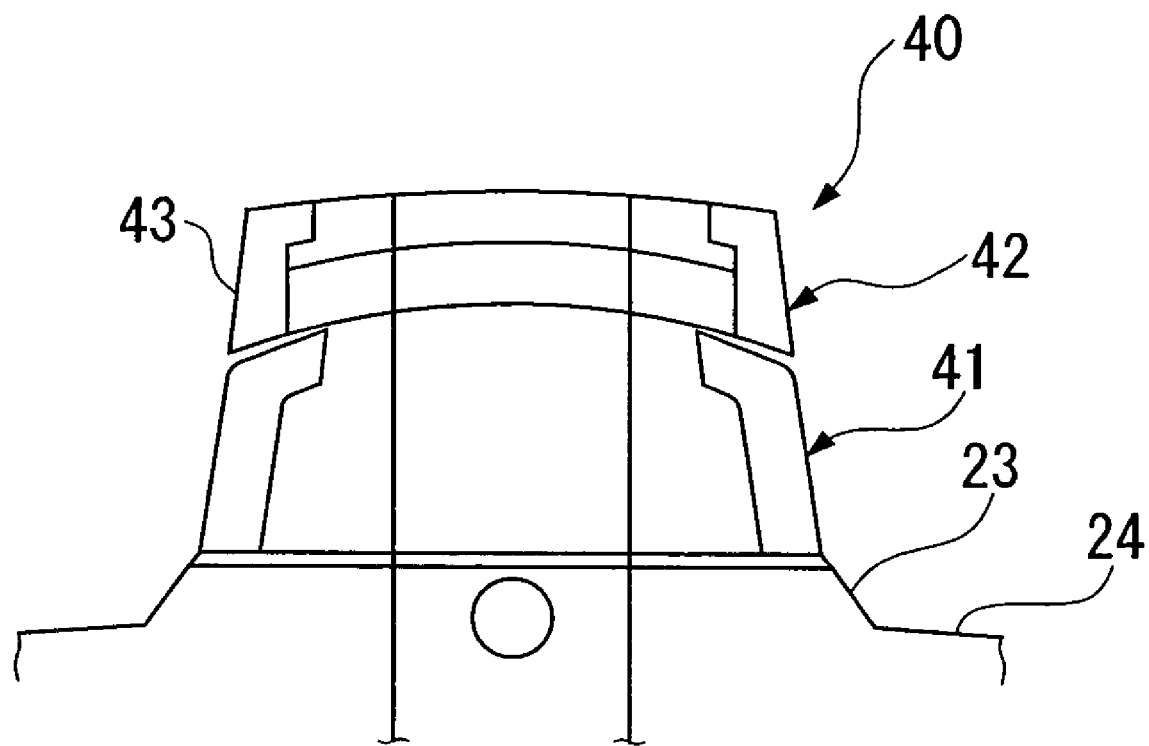
FIG. 6 is a sectional view of a variant example of the operating device as shown in FIG. 5.

FIG. 6 is a sectional view of an operating device 40 which is a variant example of the operating device 2 as shown in FIG. 5. Like reference numerals are given to like elements as in FIG. 5. In the operating member 40, the diameter of the lower surface of a knob 43 at the tip of a slidable operating member 42 is substantially equal to or slightly greater than the diameter of the upper surface of a rotatable operating member 41. Also in this case, like the operating device 2, a misoperation in performing the slide operation or rotation operation can be prevented, improving the operability.

The present invention is not limited to the above embodiment of an operating member. For example, the shape of a slidable operating member may be a conical or pyramidal one. Furthermore, the operating device of the present invention may be applied for operating, in addition to the navigation system, an air conditioner and other equipment. In addition, the rotatable operating member, provided that it is separate from the slidable operating member, may also be operable in other ways than rotation.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An operating device for controlling a display screen, comprising:
   a rotatable operating member of cylindrical shape; and
   a slidable operating member having a cylindrical tip portion located above an upper end of said rotatable operating member, said rotatable operating member and said slidable operating member being separate pieces and being used for controlling said display screen,
   wherein a diameter of an upper surface of said cylindrical tip portion of said slidable operating member is reduced relative to a diameter of a lower surface of said cylindrical tip portion, and said diameter of said lower surface of said cylindrical tip portion of said slidable operating member is equal to or less than a diameter of an upper surface of said rotatable operating member,
   wherein the rotatable operating member allows only rotating operation,
   wherein an outer circumference side of the upper surface of the rotatable operating member is exposed from below the lower surface of the slidable operating member to provide a relief portion.

2. The operating device according to claim 1, wherein a height of said rotatable operating member is greater than a height of said cylindrical tip portion of said slidable operating member.

3. The operating device according to claim 1, wherein said diameter of said lower surface of said cylindrical tip portion of said slidable operating member is less than said diameter of said upper surface of said rotatable operating member to provide the relief portion on said upper surface of said rotatable operating member.

4. The operating device according to claim 1, wherein said rotatable operating member is provided on a projection such that a side surface of said rotatable operating member is contiguous to said projection.

5. The operating device according to claim 1, wherein said diameter of said upper surface of said rotatable operating member is also reduced relative to a diameter of a lower surface of said rotatable operating member.

6. An operating device comprising:
   a rotatable operating member according to claim 1 that is rotated to make a selection among menus displayed on a screen; and
   a slidable operating member according to claim 1 that is depressed to make a decision on said menus,
   wherein a deleting feature is allocated to slide operation of said slidable operating member.

7. An operating device for controlling a display screen, comprising:
   a rotatable operating member of cylindrical shape; and
   a slidable operating member having a tip portion located above an upper end of said rotatable operating member, said rotatable operating member and said slidable operating member are separate pieces and being used for controlling said display screen,
   wherein a diameter of an upper surface of said rotatable operating member is reduced relative to a diameter of a lower surface of said rotatable operating member to provide an inclined side surface,
   wherein said tip portion of said slidable operating member is located inwardly of an imaginary line extending from said inclined side surface of said rotatable operating member, and
   wherein the rotatable operating member allows only rotating operation,
   wherein an outer circumference side of the upper surface of the rotatable operating member is exposed from below the lower surface of the slidable operating member to provide a relief portion.

8. The operating device according to claim 7, wherein said rotatable operating member is provided on a projection such that said inclined side surface of said rotatable operating member is contiguous to said projection.

9. An operating device comprising:
   a rotatable operating dial that is only rotated and makes a selection among menus displayed on a screen; and
   a slidable operating member that is depressed to make a decision on said menus, the slidable operating member having a cylindrical tip portion located above an upper end of said rotatable operating member, wherein the slidable operating member and the rotatable operating dial are separate pieces, a diameter of an upper surface of said cylindrical tip portion of said slidable operating member is reduced relative to a diameter of a lower surface of said cylindrical tip portion, and said diameter of said lower surface of said cylindrical tip portion of said slidable operating member is equal to or less than a diameter of an upper surface of said rotatable operating member,
   wherein a deleting feature is allocated to slide operation of said slidable operating member,
   wherein an outer circumference side of the upper surface of the rotatable operating member is exposed from below the lower surface of the slidable operating member to provide a relief portion.

10. An operating device comprising:
    a rotatable operating member of a cylindrical shape that is only rotated and makes a selection among menus displayed on a screen; and a slidable operating member that is depressed to make a decision on said menus, the slidable operating member having a cylindrical tip portion located above an upper end of said rotatable operating member, wherein the slidable operating member and the rotatable operating dial are separate pieces, a diameter of an upper surface of said cylindrical tip portion of said slidable operating member is reduced relative to a diameter of a lower surface of said cylindrical tip portion, and said diameter of said lower surface of said cylindrical tip portion of said slidable operating member is equal to or less than a diameter of an upper surface of said rotatable operating member, wherein a deleting feature is allocated to slide operation of said slidable operating member, wherein an outer circumference side of the upper surface of the rotatable operating member is exposed from below the lower surface of the slidable operating member to provide a relief portion.

* * * * *